(12) United States Patent
Moon et al.

(10) Patent No.: US 10,431,813 B2
(45) Date of Patent: Oct. 1, 2019

(54) CARBON-SILICON COMPOSITE STRUCTURE AND METHOD OF PREPARING THE SAME

(71) Applicant: Sogang University Research Foundation, Seoul (KR)

(72) Inventors: Jun Hyuk Moon, Seoul (KR); Whonhee Lee, Seoul (KR)

(73) Assignee: Sogang University Research Foundation, Seoul (KR)

( * ) Notice: Subject to any disclaimer, the term of this patent is extended or adjusted under 35 U.S.C. 154(b) by 317 days.

(21) Appl. No.: 15/441,392

(22) Filed: Feb. 24, 2017

(65) Prior Publication Data

US 2017/0162867 A1 Jun. 8, 2017

Related U.S. Application Data

(63) Continuation of application No. PCT/KR2015/008882, filed on Aug. 25, 2015.

(30) Foreign Application Priority Data

Aug. 25, 2014 (KR) .................. 10-2014-0110988

(51) Int. Cl.
| | | |
|---|---|---|
| *H01B 1/04* | (2006.01) | |
| *H01M 4/36* | (2006.01) | |
| *H01M 4/133* | (2010.01) | |
| *H01M 4/587* | (2010.01) | |
| *H01M 4/38* | (2006.01) | |
| *H01M 10/0525* | (2010.01) | |
| *C01B 33/02* | (2006.01) | |
| *H01M 4/134* | (2010.01) | |

(Continued)

(52) U.S. Cl.
CPC ............ *H01M 4/364* (2013.01); *C01B 32/05* (2017.08); *C01B 33/02* (2013.01); *H01B 1/04* (2013.01); *H01M 4/133* (2013.01); *H01M 4/134* (2013.01); *H01M 4/386* (2013.01); *H01M 4/587* (2013.01); *H01M 10/0525* (2013.01); *C01P 2004/60* (2013.01); *H01M 2004/027* (2013.01)

(58) Field of Classification Search
CPC ..... C01B 32/05; C01B 33/02; C01P 2004/60; H01M 10/0525; H01M 2004/027; H01M 4/133; H01M 4/134; H01M 4/364; H01M 4/386; H01M 4/587; H01B 1/04
See application file for complete search history.

(56) References Cited

U.S. PATENT DOCUMENTS

| | | | | |
|---|---|---|---|---|
| 2011/0311873 A1* | 12/2011 | Schulz | ............... | H01M 4/0416 429/231.8 |
| 2015/0321920 A1* | 11/2015 | Geramita | .................. | B01J 6/00 423/445 R |

FOREIGN PATENT DOCUMENTS

| | | |
|---|---|---|
| JP | 2000149927 A | 5/2000 |
| JP | 2011527982 A | 11/2011 |
| KR | 20090066031 A | 6/2009 |

(Continued)

*Primary Examiner* — Mark Kopec
*Assistant Examiner* — Jaison P Thomas
(74) *Attorney, Agent, or Firm* — Fox Rothschild LLP

(57) ABSTRACT

The present disclosure relates to a carbon-silicon composite structure including a carbon particle layer having silicon nanoparticles dispersed therein, a method of preparing the carbon-silicon composite structure, a secondary battery anode material including the carbon-silicon composite structure, and a secondary battery including the secondary battery anode material.

12 Claims, 6 Drawing Sheets

(51) Int. Cl.
*C01B 32/05* (2017.01)
*H01M 4/02* (2006.01)

(56) References Cited

FOREIGN PATENT DOCUMENTS

| KR | 101248108 B1 | 3/2013 |
| KR | 20130098233 A | 9/2013 |
| KR | 20130124813 A | 11/2013 |
| KR | 20140028449 A | 3/2014 |

\* cited by examiner

CARBON-SILICON COMPOSITE STRUCTURE AND METHOD OF PREPARING THE SAME

CROSS-REFERENCE TO RELATED APPLICATIONS

This application is a continuation of PCT Application No. PCT/KR2015/008882, filed on Aug. 25, 2015, which claims priority to Korean Patent Application Number 10-2014-0110988, filed on Aug. 25, 2014, both of which are hereby incorporated by reference in their entirety.

TECHNICAL FIELD

The invention relates to a carbon-silicon composite structure including a carbon particle layer which in silicon nanoparticles are dispersed, a method of preparing the same, a secondary battery anode material including the same, and a secondary battery including the anode material.

BACKGROUND

Secondary batteries are being used as large-capacity power storage batteries for electric vehicles or battery power storage systems and small high-performance energy sources for portable electronic devices such as mobile phones, camcorders, notebooks, and the like. In order to miniaturize portable electronic devices and achieve long-term continuous use, studies on weight lightening of components and low power consumption and secondary batteries having a small size with high capacity are required.

Recently, in the secondary battery market, the development of an anode active material which enables large size, high capacity and high performance has been demanded in order to be used in portable electronic devices and information communication devices and also in energy storage devices for hybrid vehicles (HEV or PHEV) or power generation systems. However, highly crystalline carbon-based active materials commercially used as an anode active material for a conventional secondary battery have a limited theoretical capacity of 372 mAh/g despite having excellent characteristics as active materials for batteries, and, thus, the development of an improved anode active material is essential in order to develop high-capacity and high-performance lithium secondary batteries.

Silicon is an example of non-carbon-based anode active materials, and silicon (Si) has a high discharge capacity of 4,200 mAh/g and a very low lithium reaction potential of 0.4 V (Li/Li$^+$) and is thus known to be the most suitable for an anode material. However, silicon undergoes volume expansion up to 400% upon insertion (charge) of lithium ions, and, thus, the capacity cannot be maintained, and due to a low electric conductivity or the like, silicon needs to be improved in this matter in order to be commercialized as an anode active material.

Meanwhile, Korean Patent No. 10-1248108 relates to a negative electrode for lithium ion secondary battery including an amorphous silicon oxide thin film, and discloses a method of preparing the negative electrode for lithium ion secondary battery, including forming the amorphous silicon oxide thin film of SiO$_x$ (0.3≤x≤1.5).

DISCLOSURE OF THE INVENTION

Problems to be Solved by the Invention

The present disclosure provides a method of preparing a carbon-silicon composite structure including a carbon particle layer in which silicon nanoparticles are dispersed, a carbon-silicon composite structure prepared by the method, a secondary battery anode material including the carbon-silicon composite structure, and a secondary battery including the secondary battery anode material.

However, problems to be solved by the present disclosure are not limited to the above-described problems, and although not described herein, other problems to be solved by the present disclosure can be clearly understood by those skilled in the art from the following descriptions.

Means for Solving the Problems

In accordance with a first aspect of the present disclosure, there is provided a method of preparing a carbon-silicon composite structure, including: polymerizing an aromatic monomer to form polymer particles; cross-linking the polymer particles to obtain cross-linked polymer particles; carbonizing the cross-linked polymer particles through calcination to obtain carbon particles; and mixing the carbon particles with the silicon nanoparticles to obtain a carbon particle layer in which silicon nanoparticles are dispersed.

In accordance with a second aspect of the present disclosure, there is provided a carbon-silicon composite structure including a carbon particle layer in which silicon nanoparticles are dispersed, which is prepared by the method according to the first aspect of the present disclosure.

In accordance with a third aspect of the present disclosure, there is provided a secondary battery anode material including the carbon-silicon composite structure according to the second aspect of the present disclosure.

In accordance with a fourth aspect of the present disclosure, there is provided a secondary battery including an anode including the secondary battery anode material according to the third aspect of the present disclosure, a cathode, a separator, and an electrolyte.

Effects of the Invention

According to an embodiment of the present disclosure, a carbon-silicon composite structure is formed by synthesizing nano-sized carbon particles and then physically mixing the carbon particles with crystalline silicon nanoparticles and uniformly dispersing the crystalline silicon nanoparticles in a carbon particle layer, and by using the carbon-silicon composite structure as a secondary battery anode material, capacity characteristics of silicon as an electrode material can be improved. Further, since the crystalline silicon nanoparticles are uniformly distributed in the carbon particle layer, a force caused by excessive volume expansion of silicon occurring when a lithium-ion battery is charged and discharged is dispersed by the carbon particle layer, so that pulverization of silicon particles or detachment of silicon particles from a collector can be suppressed and the capacity can be maintained, and, thus, lifespan characteristics of a secondary battery such as a lithium-ion battery can be improved.

According to an embodiment of the present disclosure, it is possible to provide a secondary battery anode material with high capacity and long lifespan by suppressing excessive volume expansion of silicon. Further, since the secondary battery anode material includes silicon having a high theoretical capacity (4,200 mAh/g), it is possible to implement a high electron capacity as compared with a conventional graphite electrode (372 mAh/g) being commercially used.

BEST MODE FOR CARRYING OUT THE INVENTION

Figure 1:
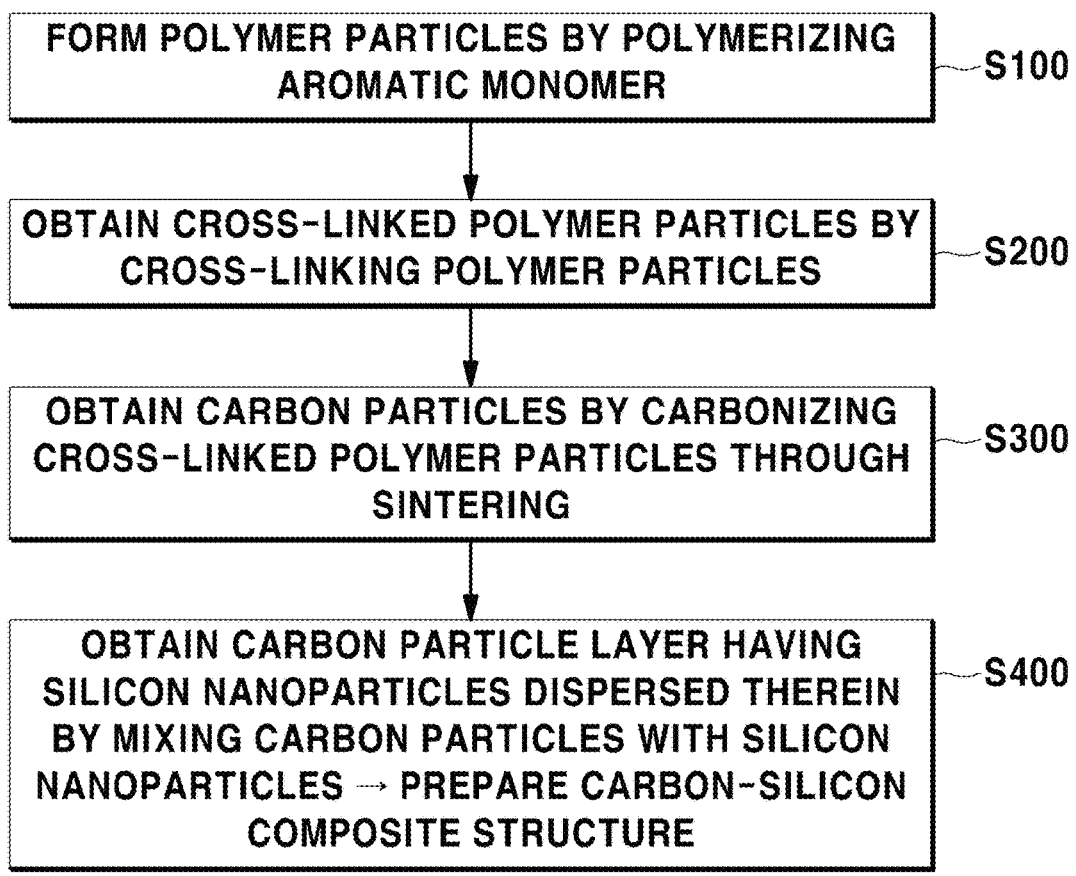
FIG. 1 is a flowchart illustrating a method of preparing a carbon-silicon composite structure in accordance with an embodiment of the present disclosure.

Hereinafter, embodiments and examples of the present disclosure will be described in detail with reference to the accompanying drawings so that the present disclosure may be readily implemented by those skilled in the art. However, it is to be noted that the present disclosure is not limited to the embodiments and examples but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element.

Through the whole document, the term "on" that is used to designate a position of one element with respect to another element includes both a case that the one element is adjacent to the another element and a case that any other element exists between these two elements.

Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise.

Through the whole document, the term "about or approximately" or "substantially" are intended to have meanings close to numerical values or ranges specified with an allowable error and intended to prevent accurate or absolute numerical values disclosed for understanding of the present disclosure from being illegally or unfairly used by any unconscionable third party.

Through the whole document, the term "step of" does not mean "step for".

Through the whole document, the term "combination(s) of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through the whole document, a phrase in the form "A and/or B" means "A or B, or A and B".

Hereinafter, embodiments of the present disclosure will be described in detail, but the present disclosure may not be limited thereto.

In accordance with a first aspect of the present disclosure, there is provided a method of preparing a carbon-silicon composite structure, including: polymerizing an aromatic monomer to form polymer particles; cross-linking the polymer particles to obtain cross-linked polymer particles; carbonizing the cross-linked polymer particles through calcination to obtain carbon particles; and mixing the carbon particles with the silicon nanoparticles to obtain a carbon particle layer in which silicon nanoparticles are dispersed.

FIG. 1 is a detailed flowchart illustrating a method of preparing a carbon-silicon composite structure in accordance with an embodiment of the present disclosure. Hereinafter, an embodiment of the present disclosure will be described in detail with reference to FIG. 1.

In an embodiment of the present disclosure, the method of preparing a carbon-silicon composite structure may be a method of preparing a silicon-carbon structure which can be used as an anode material for a lithium-ion battery by synthesizing a copolymer through an emulsion polymerization reaction, forming a micropore structure and synthesizing carbon particles through selective cross-linking and selective carbonization of the copolymer, physically mixing them with crystalline silicon nanoparticles, and dispersing the crystalline silicon nanoparticles within a carbon particle layer.

In S100 of FIG. 1, polymer particles are formed by polymerizing an aromatic monomer.

In an embodiment of the present disclosure, the polymerizing of the aromatic monomer (S100) may include forming a spherical polymer through an emulsion polymerization reaction, but may not be limited thereto.

In an embodiment of the present disclosure, the aromatic monomer may include one member selected from the group consisting of styrenes, benzamides, butyleneterephthalates, ethyleneterephthalates, methylmethacrylate-based compounds, vinylpyridine-based compounds, and combinations thereof, but may not be limited thereto.

In S200 of FIG. 1, cross-linked polymer particles are obtained by cross-linking the polymer particles.

In an embodiment of the present disclosure, the cross-linking of the polymer particles (S200) may include selectively cross-linking the polymer particles through a Friedel-Crafts acylation reaction, but may not be limited thereto. For example, the cross-linking may be a post-cross-linking reaction using a Friedel-Crafts, but may not be limited thereto. The post-cross-linking reaction refers to cross-linking after particles are synthesized in order to additionally cross-link the synthesized particles since a cross-linking agent is already contained when the particles are produced.

The Friedel-Crafts acylation reaction is a reaction that induces acylation of an aromatic compound by reacting the aromatic compound with acyl halide in the presence of a catalyst. For example, when benzene and acyl halide (RCOCl) are reacted in the presence of a metal halide catalyst such as aluminum halide ($AlCl_3$) or antimony (V) chloride, iron (III) chloride, zinc (IV) chloride, or the like, a compound in which an acyl group (RCO—) is bonded to a benzene ring is produced (see the following Reaction Formula 1).

[Reaction Formula 1]

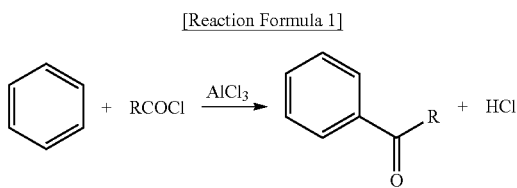

In S300 of FIG. 1, carbon particles are obtained by carbonizing the cross-linked polymer particles through calcination.

In an embodiment of the present disclosure, the cross-linked polymer particles may be selectively carbonized by the selective cross-linking, and porous carbon particles may be prepared by the selective carbonization, but the present disclosure may not be limited thereto.

In an embodiment of the present disclosure, the calcination of the cross-linked polymer particles (S300) may be performed at a temperature of from about 600° C. to about 1,100° C., but may not be limited thereto. The calcination temperature may be used as described above, but can be selected by those skilled in the art from a temperature range in which the cross-linked polymer particles can be carbonized depending on the kind of the polymer, and the calcination temperature may be, for example, from about 600° C. to about 700° C., from about 600° C. to about 800° C., from about 600° C. to about 900° C., from about 600° C. to about 1,000° C., from about 600° C. to about 1,100° C., from about 700° C. to about 800° C., from about 700° C. to about 900° C., from about 700° C. to about 1,000° C., from about 700° C. to about 1,100° C., from about 800° C. to about 900° C., from about 800° C. to about 1,000° C., from about 800° C. to about 1,100° C., from about 900° C. to about 1,000° C., from about 900° C. to about 1,100° C., or from about 1,000° C. to about 1,100° C., but may not be limited thereto.

In an embodiment of the present disclosure, the cross-linked polymer particles may be carbonized by injecting an inert gas such as argon and heating at the calcination temperature and then cooled to room temperature, but may not be limited thereto.

In S400 of FIG. 1, a carbon particle layer in which silicon nanoparticles are dispersed, which is obtained by mixing the carbon particles with the silicon nanoparticles.

In an embodiment of the present disclosure, the obtaining of the carbon particle layer in which silicon nanoparticles are dispersed (S400) may include forming a carbon particle layer in which crystalline silicon nanoparticles are uniformly dispersed by physically mixing the carbon particles obtained by calcination the polymer particles with the crystalline silicon nanoparticles, but may not be limited thereto.

In an embodiment of the present disclosure, the silicon nanoparticles may be crystalline, but may not be limited thereto.

In an embodiment of the present disclosure, the silicon nanoparticles may have a size of from about 10 nm to about 10 μm, but may not be limited thereto. For example, the silicon nanoparticles may have a size of from about 10 nm to about 100 nm, from about 10 nm to about 200 nm, from about 10 nm to about 300 nm, from about 10 nm to about 400 nm, from about 10 nm to about 500 nm, from about 10 nm to about 600 nm, from about 10 nm to about 700 nm, from about 10 nm to about 800 nm, from about 10 nm to about 900 nm, from about 10 nm to about 1 μm, from about 10 nm to about 5 μm, from about 10 nm to about 10 μm, from about 100 nm to about 200 nm, from about 100 nm to about 300 nm, from about 100 nm to about 400 nm, from about 100 nm to about 500 nm, from about 100 nm to about 600 nm, from about 100 nm to about 700 nm, from about 100 nm to about 800 nm, from about 100 nm to about 900 nm, from about 100 nm to about 1 μm, from about 100 nm to about 5 μm, from about 100 nm to about 10 μm, from about 200 nm to about 300 nm, from about 200 nm to about 400 nm, from about 200 nm to about 500 nm, from about 200 nm to about 600 nm, from about 200 nm to about 700 nm, from about 200 nm to about 800 nm, from about 200 nm to about 900 nm, from about 200 nm to about 1 μm, from about 200 nm to about 5 μm, from about 200 nm to about 10 μm, from about 300 nm to about 400 nm, from about 300 nm to about 500 nm, from about 300 nm to about 600 nm, from about 300 nm to about 700 nm, from about 300 nm to about 800 nm, from about 300 nm to about 900 nm, from about 300 nm to about 1 μm, from about 300 nm to about 5 μm, from about 300 nm to about 10 μm, from about 400 nm to about 500 nm, from about 400 nm to about 600 nm, from about 400 nm to about 700 nm, from about 400 nm to about 800 nm, from about 400 nm to about 900 nm, from about 400 nm to about 1 μm, from about 400 nm to about 5 μm, from about 400 nm to about 10 μm, from about 500 nm to about 600 nm, from about 500 nm to about 700 nm, from about 500 nm to about 800 nm, from about 500 nm to about 900 nm, from about 500 nm to about 1 μm, from about 500 nm to about 5 μm, from about 500 nm to about 10 μm, from about 600 nm to about 700 nm, from about 600 nm to about 800 nm, from about 600 nm to about 900 nm, from about 600 nm to about 1 μm, from about 600 nm to about 5 μm, from about 600 nm to about 10 μm, from about 700 nm to about 800 nm, from about 700 nm to about 900 nm, from about 700 nm to about 1 μm, from about 700 nm to about 5 μm, from about 700 nm to about 10 μm, from about 800 nm to about 900 nm, from about 800 nm to about 1 μm, from about 800 nm to about 5 μm, from about 800 nm to about 10 μm, from about 900 nm to about 1 μm, from about 900 nm to about 5 μm, from about 900 nm to about 10 μm, from about 1 μm to about 5 μm, from about 1 μm to about 10 μm, or from about 5 μm to about 10 μm, but may not be limited thereto.

In an embodiment of the present disclosure, the carbon particle layer may include carbon particles having pores, but may not be limited thereto. The pores in the carbon particles may be formed by selective cross-linking and selective carbonization of the polymer particles. For example, the pores in the carbon particles may be mesopores or micropores, but may not be limited thereto.

In an embodiment of the present disclosure, the carbon particles may have a size of from about 100 nm to about 1 μm, but may not be limited thereto. For example, the carbon particles may have a size of from about 100 nm to about 200 nm, from about 100 nm to about 300 nm, from about 100 nm to about 400 nm, from about 100 nm to about 500 nm, from about 100 nm to about 600 nm, from about 100 nm to about 700 nm, from about 100 nm to about 800 nm, from about 100 nm to about 900 nm, from about 100 nm to about 1 μm, from about 200 nm to about 300 nm, from about 200 nm to about 400 nm, from about 200 nm to about 500 nm, from about 200 nm to about 600 nm, from about 200 nm to about 700 nm, from about 200 nm to about 800 nm, from about 200 nm to about 900 nm, from about 200 nm to about 1 μm, from about 300 nm to about 400 nm, from about 300 nm to about 500 nm, from about 300 nm to about 600 nm, from about 300 nm to about 700 nm, from about 300 nm to about 800 nm, from about 300 nm to about 900 nm, from about 300 nm to about 1 μm, from about 400 nm to about 500 nm, from about 400 nm to about 600 nm, from about 400 nm to about 700 nm, from about 400 nm to about 800 nm, from about 400 nm to about 900 nm, from about 400 nm to about 1 µm, from about 500 nm to about 600 nm, from about 500 nm to about 700 nm, from about 500 nm to about 800 nm, from about 500 nm to about 900 nm, from about 500 nm to about 1 µm, from about 600 nm to about 700 nm, from about 600 nm to about 800 nm, from about 600 nm to about 900 nm, from about 600 nm to about 1 µm, from about 700 nm to about 800 nm, from about 700 nm to about 900 nm, from about 700 nm to about 1 µm, from about 800 nm to about 900 nm, from about 800 nm to about 1 µm, or from about 900 nm to about 1 µm, but may not be limited thereto.

In accordance with a second aspect of the present disclosure, there is provided a carbon-silicon composite structure including a carbon particle layer in which silicon nanoparticles are dispersed, which is prepared by the method according to the first aspect of the present disclosure. All the descriptions of the method of preparing a carbon-silicon composite structure in accordance with the first aspect of the present disclosure can be applied to the carbon-silicon composite structure in accordance with the second aspect of the present disclosure, and detailed descriptions of parts of the second aspect, which overlap with those of the first aspect, are omitted hereinafter, but the descriptions of the first aspect of the present disclosure may be identically applied to the second aspect of the present disclosure, even though they are omitted hereinafter.

In an embodiment of the present disclosure, the silicon nanoparticles may be crystalline, but may not be limited thereto.

In an embodiment of the present disclosure, the silicon nanoparticles may have a size of from about 10 nm to about 10 µm, but may not be limited thereto. For example, the silicon nanoparticles may have a size of from about 10 nm to about 100 nm, from about 10 nm to about 200 nm, from about 10 nm to about 300 nm, from about 10 nm to about 400 nm, from about 10 nm to about 500 nm, from about 10 nm to about 600 nm, from about 10 nm to about 700 nm, from about 10 nm to about 800 nm, from about 10 nm to about 900 nm, from about 10 nm to about 1 µm, from about 10 nm to about 5 µm, from about 10 nm to about 10 µm, from about 100 nm to about 200 nm, from about 100 nm to about 300 nm, from about 100 nm to about 400 nm, from about 100 nm to about 500 nm, from about 100 nm to about 600 nm, from about 100 nm to about 700 nm, from about 100 nm to about 800 nm, from about 100 nm to about 900 nm, from about 100 nm to about 1 µm, from about 100 nm to about 5 µm, from about 100 nm to about 10 µm, from about 200 nm to about 300 nm, from about 200 nm to about 400 nm, from about 200 nm to about 500 nm, from about 200 nm to about 600 nm, from about 200 nm to about 700 nm, from about 200 nm to about 800 nm, from about 200 nm to about 900 nm, from about 200 nm to about 1 µm, from about 200 nm to about 5 µm, from about 200 nm to about 10 µm, from about 300 nm to about 400 nm, from about 300 nm to about 500 nm, from about 300 nm to about 600 nm, from about 300 nm to about 700 nm, from about 300 nm to about 800 nm, from about 300 nm to about 900 nm, from about 300 nm to about 1 µm, from about 300 nm to about 5 µm, from about 300 nm to about 10 µm, from about 400 nm to about 500 nm, from about 400 nm to about 600 nm, from about 400 nm to about 700 nm, from about 400 nm to about 800 nm, from about 400 nm to about 900 nm, from about 400 nm to about 1 µm, from about 400 nm to about 5 µm, from about 400 nm to about 10 µm, from about 500 nm to about 600 nm, from about 500 nm to about 700 nm, from about 500 nm to about 800 nm, from about 500 nm to about 900 nm, from about 500 nm to about 1 µm, from about 500 nm to about 5 µm, from about 500 nm to about 10 µm, from about 600 nm to about 700 nm, from about 600 nm to about 800 nm, from about 600 nm to about 900 nm, from about 600 nm to about 1 µm, from about 600 nm to about 5 µm, from about 600 nm to about 10 µm, from about 700 nm to about 800 nm, from about 700 nm to about 900 nm, from about 700 nm to about 1 µm, from about 700 nm to about 5 µm, from about 700 nm to about 10 µm, from about 800 nm to about 900 nm, from about 800 nm to about 1 µm, from about 800 nm to about 5 µm, from about 800 nm to about 10 µm, from about 900 nm to about 1 µm, from about 900 nm to about 5 µm, from about 900 nm to about 10 µm, from about 1 µm to about 5 µm, from about 1 µm to about 10 µm, or from about 5 µm to about 10 µm, but may not be limited thereto.

In an embodiment of the present disclosure, the carbon particle layer may include carbon particles having pores, but may not be limited thereto. The pores in the carbon particles may be formed by selective cross-linking and selective carbonization of the polymer particles. For example, the pores in the carbon particles may be mesopores or micropores, but may not be limited thereto.

In an embodiment of the present disclosure, the carbon particles may have a size of from about 100 nm to about 1 µm, but may not be limited thereto. For example, the carbon particles may have a size of from about 100 nm to about 200 nm, from about 100 nm to about 300 nm, from about 100 nm to about 400 nm, from about 100 nm to about 500 nm, from about 100 nm to about 600 nm, from about 100 nm to about 700 nm, from about 100 nm to about 800 nm, from about 100 nm to about 900 nm, from about 100 nm to about 1 µm, from about 200 nm to about 300 nm, from about 200 nm to about 400 nm, from about 200 nm to about 500 nm, from about 200 nm to about 600 nm, from about 200 nm to about 700 nm, from about 200 nm to about 800 nm, from about 200 nm to about 900 nm, from about 200 nm to about 1 µm, from about 300 nm to about 400 nm, from about 300 nm to about 500 nm, from about 300 nm to about 600 nm, from about 300 nm to about 700 nm, from about 300 nm to about 800 nm, from about 300 nm to about 900 nm, from about 300 nm to about 1 µm, from about 400 nm to about 500 nm, from about 400 nm to about 600 nm, from about 400 nm to about 700 nm, from about 400 nm to about 800 nm, from about 400 nm to about 900 nm, from about 400 nm to about 1 µm, from about 500 nm to about 600 nm, from about 500 nm to about 700 nm, from about 500 nm to about 800 nm, from about 500 nm to about 900 nm, from about 500 nm to about 1 µm, from about 600 nm to about 700 nm, from about 600 nm to about 800 nm, from about 600 nm to about 900 nm, from about 600 nm to about 1 µm, from about 700 nm to about 800 nm, from about 700 nm to about 900 nm, from about 700 nm to about 1 µm, from about 800 nm to about 900 nm, from about 800 nm to about 1 µm, or from about 900 nm to about 1 µm, but may not be limited thereto.

In accordance with a third aspect of the present disclosure, there is provided a secondary battery anode material including the carbon-silicon composite structure according to the second aspect of the present disclosure. All the descriptions of the method of preparing a carbon-silicon composite structure in accordance with the first aspect of the present disclosure and the carbon-silicon composite structure in accordance with the second aspect of the present disclosure can be applied to the secondary battery anode material in accordance with the third aspect of the present disclosure, and detailed descriptions of parts of the third aspect, which overlap with those of the first and second aspects, are omitted hereinafter, but the descriptions of the first and second aspects of the present disclosure may be identically applied to the third aspect of the present disclosure, even though they are omitted hereinafter.

In an embodiment of the present disclosure, the carbon-silicon composite structure may include a carbon particle layer in which silicon nanoparticles are dispersed, but may not be limited thereto.

In an embodiment of the present disclosure, the secondary battery anode material uses the carbon particle layer formed of nano-sized carbon particles and thus can suppress volume expansion and contraction of silicon occurring during charge/discharge and also suppress detachment from a collector, so that the secondary battery anode material can improve low lifespan characteristics of silicon, and also, the carbon particle layer enables insertion and secession of lithium ions and thus can contribute to the capacity of an electrode.

In accordance with a fourth aspect of the present disclosure, there is provided a secondary battery including an anode including the secondary battery anode material according to the third aspect of the present disclosure, a cathode, a separator, and an electrolyte. All the descriptions of the first to third aspects of the present disclosure can be applied to the secondary battery in accordance with the fourth aspect of the present disclosure, and detailed descriptions of parts of the fourth aspect, which overlap with those of the first to third aspects, are omitted hereinafter, but the descriptions of the first to third aspects of the present disclosure may be identically applied to the fourth aspect of the present disclosure, even though they are omitted hereinafter.

In an embodiment of the present disclosure, the secondary battery may include a lithium-ion battery, but may not be limited thereto.

For example, the anode may be prepared by the following method, but may not be limited thereto.

Firstly, a composition for forming an anode active material layer may be prepared by mixing a carbon-silicon composite structure, a binder, and a solvent according to an embodiment of the present disclosure. Then, the anode may be prepared by coating and drying the composition for forming an anode active material layer on an anode collector.

The binder functions to readily bond anode active material particles to each other and also readily bond an anode active material to a current collector, and for example, the binder may include polyacrylic acid, polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butadiene rubber, fluorine rubber, or various copolymers, but may not be limited thereto, but may not be limited thereto.

The anode collector may be generally formed to a thickness of from about 3 μm to about 500 μm. The anode collector may not be particularly limited as long as it does not cause a chemical change in a corresponding battery and has conductivity, and for example, the anode collector may include: copper; stainless steel; aluminum; nickel; titanium; heat-treated carbon; or copper or stainless steel surface-treated with carbon, nickel, titanium, or silver; or aluminum-cadmium alloys, but may not be limited thereto. Further, like a cathode collector, the anode collector may increase binding power of the anode active material due to micro convexoconcave structures formed on its surface and may be used in various shapes such as film, sheet, foil, net, porous body, foamed body, or nonwoven fabric.

As the solvent, N-methyl-2-pyrrolidone (NMP), acetone, water, or mixtures thereof may be used, but the present disclosure may not be limited thereto. A content of the solvent may be from about 50 parts by weight to about 500 parts by weight with respect to 100 parts by weight of the composition for forming an anode active material layer, but may not be limited thereto. When a content of the solvent is within the above-described range, an operation for forming an active material layer can be easily performed.

The separator is not limited in kind, but may include, for example, a porous substrate prepared using a polyolefin-based polymer selected from the group consisting of ethylene homopolymers, propylene homopolymers, ethylene-butene copolymers, ethylene-hexene copolymers, and ethylene-methacrylate copolymers; a porous substrate prepared using a polymer selected from the group consisting of polyesters, polyacetals, polyamides, polycarbonates, polyimides, polyether ether ketones, polyether sulfones, polyphenylene oxides, polyphenylene sulfides, and polyethylene naphthalenes; or a porous substrate formed of a mixture of inorganic particles and a binder polymer. Particularly, in order for lithium ions in a lithium ion supply core unit to be easily transferred to an external electrode, it is desirable to use a separator formed of nonwoven fabric corresponding to the porous substrate prepared using a polymer selected from the group consisting of polyesters, polyacetals, polyamides, polycarbonates, polyimides, polyether ether ketones, polyether sulfones, polyphenylene oxides, polyphenylene sulfides, polyethylene naphthalenes, and combinations thereof.

As the electrolyte, for example, a gel-type polymer electrolyte using PEO (polyethylene oxide), PVdF (polyvinylidene fluoride), PVdF-HFP (polyvinylidene fluoride-hexafluoropropylene), PMMA [poly(methyl 2-methylpropenoate)], PAN (polyacrylonitrile), or PVAc [poly(ethenyl ethanoate)]; or a solid electrolyte using PEO, PPO (polypropylene oxide), PEI (polyethylene imine), PES (polyethylene sulphide), or PVAc may be used. Further, as the electrolyte, a non-aqueous electrolyte using ethylene carbonate (EC), polyethylene carbonate (PC), butylene carbonate (BC), vinylene carbonate (VC), diethyl carbonate (DEC), dimethyl carbonate (DMC), ethyl methyl carbonate (EMC), methyl formate (MF), γ-butyrolactone (γ-BL), sulfolane, methylacetate (MA), or methylpropionate (MP) may be used. The electrolyte may further include a lithium salt, and the lithium salt may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, or lithium tetraphenylborate.

In an embodiment of the present disclosure, the cathode may include a lithium metal or a lithium transition metal oxide, but may not be limited thereto, and all of the materials typically used in a lithium-ion battery can be applied to the cathode.

For example, the cathode may be prepared by the following method, but may not be limited thereto.

The cathode may be prepared by coating and drying a composition for forming a cathode active material layer on the cathode collector in the same manner as the above-described process of preparing the anode. The composition for forming a cathode active material layer may be prepared by mixing a cathode active material, a conductive material, a binder, and a solvent. The cathode active material, the binder, and the solvent may be used in the same kinds and amounts as used for preparing the anode. For example, the conductive material may include a conductive material such as polyacrylic acid, acetylene black, furnace black, graphite, carbon fiber, or fullerene, but may not be limited thereto.

The cathode collector may have a thickness of from about 3 μm to about 500 μm, and the cathode collector may not be particularly limited as long as it does not cause a chemical change in a corresponding battery and has a high conductivity, and for example, the cathode collector may include: stainless steel; aluminum; nickel; titanium; heat-treated carbon; or aluminum or stainless steel surface-treated with carbon or one member elected from the group consisting of nickel, titanium, silver, and combinations thereof, but may not be limited thereto. Further, the cathode collector may increase binding power of the cathode active material due to micro convexoconcave structures formed on its surface and may have various shapes such as film, sheet, foil, net, porous body, foamed body, or nonwoven fabric.

The lithium transition metal oxide may include one or more members selected from the group consisting of $LiCoO_2$, $LiNiO_2$, $LiMnO_2$, $LiMn_2O_4$, $Li(Ni_aCo_bMn_c)O_2$ (0<a<1, 0<b<1, 0<c<1, a+b+c=1), $LiNi_{1-Y}Co_YO_2$ (herein, 0≤Y<1), $LiCo_{1-Y}Mn_YO_2$ (herein, 0≤Y<1), $LiNi_{1-Y}Mn_YO_2$ (herein, 0≤Y<1), $LiMn_{2-Z}Ni_ZO_4$ (herein, 0<Z<2), $LiMn_{2-Z}Co_ZO_4$ (herein, 0<Z<2), $LiCoPO_4$, $LiFePO_4$, and combinations thereof, but may not be limited thereto.

The separator may be interposed between the anode and the cathode obtained by the above-described processes, and an electrolytic solution including an electrolyte may be supplied thereto, so that a lithium secondary battery may be prepared.

The lithium secondary battery may be prepared by, for example, laminating the anode, the separator, and the cathode in sequence, winding or folding them and placing them in a cylindrical or square-shaped battery case or pouch, and then injecting an organic electrolytic solution into the battery case or pouch. The separator may have a pore size of from about 0.01 μm to about 10 μm and generally have a thickness of from about 5 μm to about 300 μm. As a specific example, a sheet or nonwoven fabric formed of an olefin-based polymer such as polypropylene or polyethylene or glass fiber may be used.

The electrolytic solution may include a lithium salt dissolved in an organic solvent, but may not be limited thereto. For example, the organic solvent may be selected from the group consisting of propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyl tetrahydrofuran, γ-butyrolactone, 1,3-dioxolane, 4-methyl dioxolane, N,N-dimethylformamide, dimethylacetamide, dimethyl sulfoxide, 1,4-dioxane, 1,2-dimethoxyethane, sulfolane, dichloroethane, chlorobenzene, nitrobenzene, diethylene glycol, dimethyl ether, and combinations thereof, but may not be limited thereto.

The lithium salt may be selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (herein, x and y are natural numbers), LiCl, LiI, and combinations thereof, but may not be limited thereto.

In an embodiment of the present disclosure, the secondary battery may use an organic solid electrolyte and/or an inorganic solid electrolyte together with the separator, but may not be limited thereto. If the organic solid electrolyte and/or the inorganic solid electrolyte is used, the solid electrolyte may serve as a separator in some cases, and, thus, the above-described separator may not be used.

The organic solid electrolyte may include, for example, polyethylene derivatives, polyethylene oxide derivatives, polypropylene oxide derivatives, phosphoric acid ester polymers, polyvinyl alcohol, or polyvinylidene fluoride, but may not be limited thereto. The inorganic solid electrolyte may include, for example, $Li_3N$, LiI, $Li_5NI_2$, $Li_3N$—LiI—LiOH, $Li_2SiS_3$, $Li_4SiO_4$, $Li_4SiO_4$—LiI—LiOH, $Li_3PO_4$—$Li_2S$—$SiS_2$, and combinations thereof but may not be limited thereto.

MODE FOR CARRYING OUT THE INVENTION

Hereinafter, the present disclosure will be described in more detail with reference to Examples, but the present disclosure may not be limited thereto.

EXAMPLES

In the present Example, a copolymer was synthesized through an emulsion polymerization reaction, and a micropore structure was formed and carbon particles were synthesized through selective cross-linking and selective carbonization, and then, a silicon-carbon structure which can be used as an anode material for a lithium-ion battery was prepared by physically mixing the carbon particles with crystalline silicon nanoparticles and dispersing the crystalline silicon nanoparticles within a carbon particle layer.

Firstly, in order to form a polymer including a styrene monomer, 2.1 g of styrene was injected into a flask and nitrogen was injected therein to while increasing a temperature. When a temperature of the flask reached 70° C., 10 mL of an aqueous solution prepared by dissolving 0.12 g of potassium persulfate was injected into the flask. After 3 hours from the injection of the potassium persulfate aqueous solution, 0.9 g of divinylbenzene as a cross-linking agent was injected into the flask to make a polymerization reaction, and then copolymer particles obtained after 24 hours therefrom were separated. In order to selectively cross-link polystyrene included in the copolymer particles, a Friedel-Crafts acylation reaction was used. Firstly, a solution in which 1.80 g of aluminum chloride was added into 30 mL of chloroform was prepared. 0.3 g of the copolymer was added into the solution including chloroform and aluminum chloride and then reacted for 16 hours. After the reaction was completed, the solution was purified using a centrifuge and washed with ethanol. The washed copolymer particles were dispersed in ethanol and dried, so that cross-linked copolymer particles were obtained. After the cross-linked polystyrene (PS) copolymer was put into a calcination furnace, argon was injected and heating and calcination was performed at a high temperature. Then, sintered particles were cooled to room temperature, so that carbon particles were obtained. The carbon particles obtained from the test were physically mixing with crystalline silicon nanoparticles, so that a carbon particle layer in which the crystalline silicon nanoparticles are dispersed (carbon-silicon composite structure), which was obtained and then used as an anode active material (anode material) for a lithium-ion battery. A lithium-ion battery anode was prepared by coating a composition including the active material in the amount of 60 parts by weight, a conductive material in the amount of 20 parts by weight, and a binder in the amount of 20 parts by weight to a thickness of 100 μm on a copper collector. The thickness of the anode could be controlled according to a height of a doctor blade. A lithium metal was used as a counter electrode (cathode), and the prepared anode was used as a working electrode, and celgard 2400 and a mixed solution of ethylene carbonate (EC) in the amount of 50 parts by weight and diethyl carbonate (DEC) in the amount of 50 pars by weight in which a 1M $LiPF_6$ was dissolved were used as a separator and an electrolytic solution, respectively, were used, so that a CR2032 coin-cell was manufactured.

Figure 2:
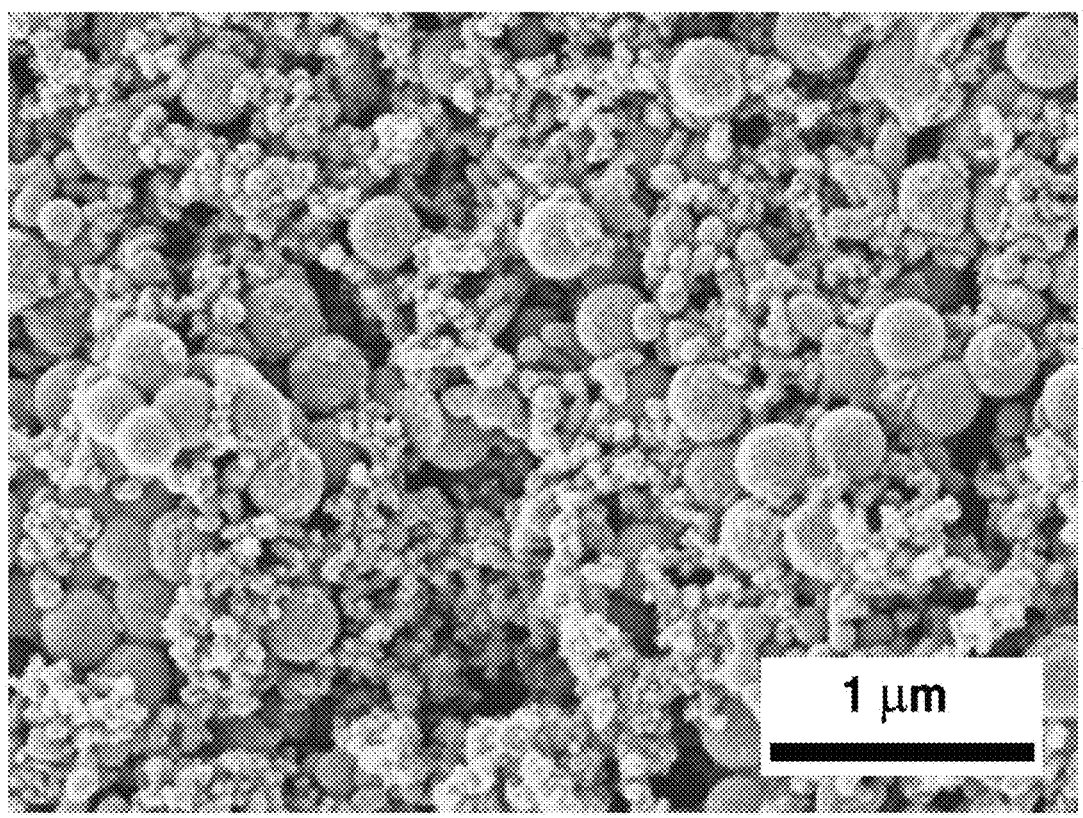
FIG. 2 is a scanning electron microscopy image of a carbon-silicon composite structure in accordance with an example of the present disclosure.
Figure 3:
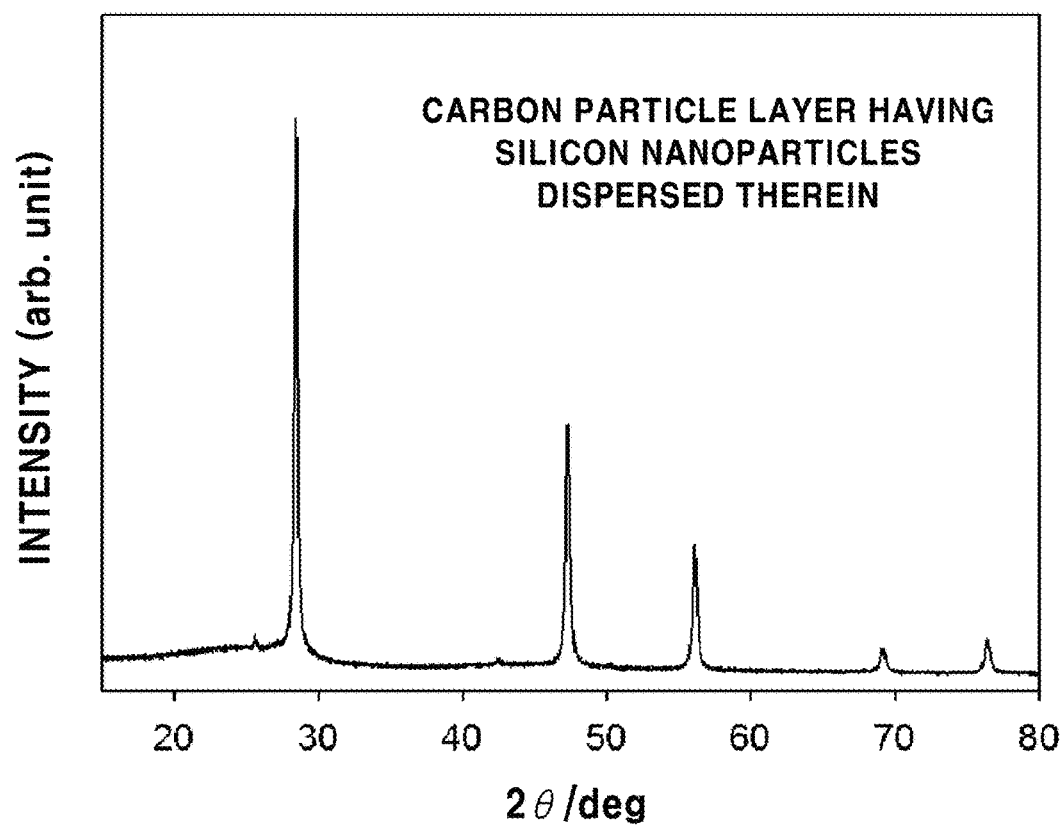
FIG. 3 shows the result of X-ray diffraction analysis of a carbon-silicon composite structure in accordance with an example of the present disclosure.

A structure of the mixture of the carbon particles and the crystalline silicon nanoparticles obtained in Example was observed using a scanning electron microscope (SEM) and energy-dispersive X-ray spectroscopy, and it was confirmed that the crystalline silicon nanoparticles were uniformly dispersed in the spherical carbon particle layer (FIG. 2 and FIG. 3). Further, in order to check composition of the mixture of the carbon particle layer and the crystalline silicon nanoparticles, X-ray diffraction and Raman spectroscopy were conducted. From positions of peaks of the X-ray diffraction and Raman spectroscopy, it was confirmed that the crystalline silicon nanoparticles have crystallinity and it was also confirmed that the synthesized carbon particle layer is amorphous carbon.

FIG. 3 is an X-ray diffraction graph of the carbon-silicon composite structure in accordance with the present Example, and shows that peaks at 28.4°, 47.3°, 56.1°, 69.1°, and 76.4° correspond to (111), (220), (311), (400), and (331) crystalline planes, respectively, and from a wide peak around 25°, it was confirmed that the carbon particle layer of the carbon-silicon composite structure according to the present Example is amorphous carbon.

Figure 4:
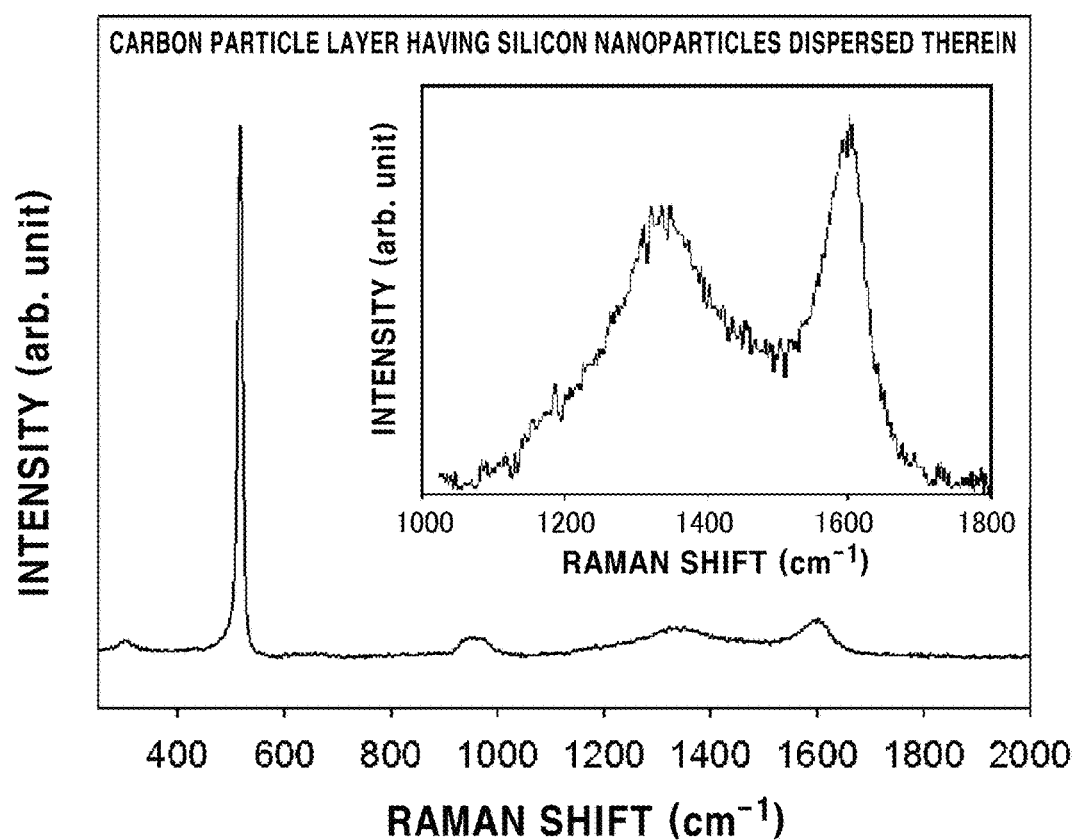
FIG. 4 shows the result of Raman spectroscopy analysis of a carbon-silicon composite structure in accordance with an example of the present disclosure.

FIG. 4 is a Raman spectroscopy spectrum of a carbon-silicon composite structure in accordance with the present Example, and a strong peak at 516 $cm^{-1}$ and a weak peak at 955.7 $cm^{-1}$ show a crystalline silicon structure. Further, peaks at 1,350 $cm^{-1}$ and 1,590 $cm^{-1}$ are relevant to the carbon particle layer and indicate a D-band and a G-band, respectively. A peak ratio of the D-band and the G-band was 0.77 and confirmed that the synthesized carbon particle layer was amorphous carbon, which was consistent with the result of X-ray diffraction.

Figure 5:
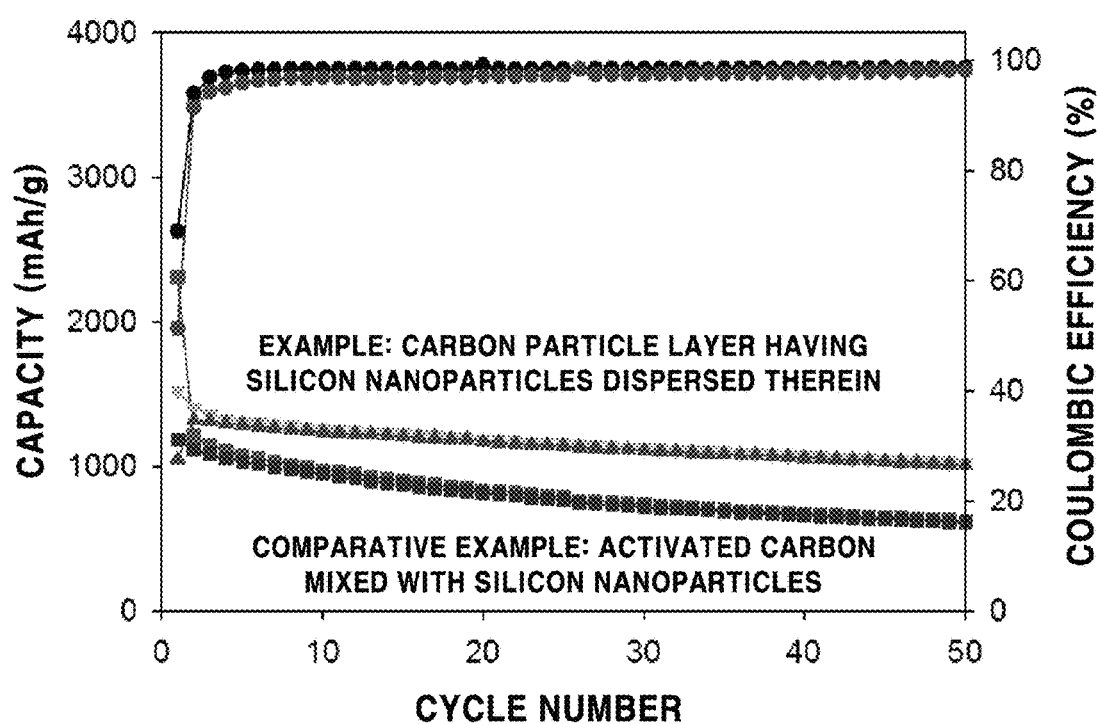
FIG. 5 shows the result of a Galvano static charge/discharge test of a carbon-silicon composite structure in accordance with an example of the present disclosure.

Further, in order to check lifespan characteristics of a battery using the carbon-silicon composite structure according to the present Example, a Galvano static charge/discharge test as electrochemical analysis was conducted, and the result thereof was as shown in FIG. 5. In the Galvano static charge/discharge test, it was observed that when an anode was formed using the carbon-silicon composite structure under a condition of 100 mA/g, there was almost no decrease in capacitance even after the progress of cycle and the capacitance was 1,050 mAh/g after 45 cycles. For comparison with the carbon-silicon composite structure according to the present Example, crystalline silicon nanoparticles were mixed with activated carbon as Comparative Example and the same test was conducted thereto, and it was confirmed that a decrease in capacitance of Comparative Example with the progress of cycle is greater than that of the carbon-silicon composite structure according to the present Example and the capacitance was 645 mAh/g after 45 cycles.

Figure 6:
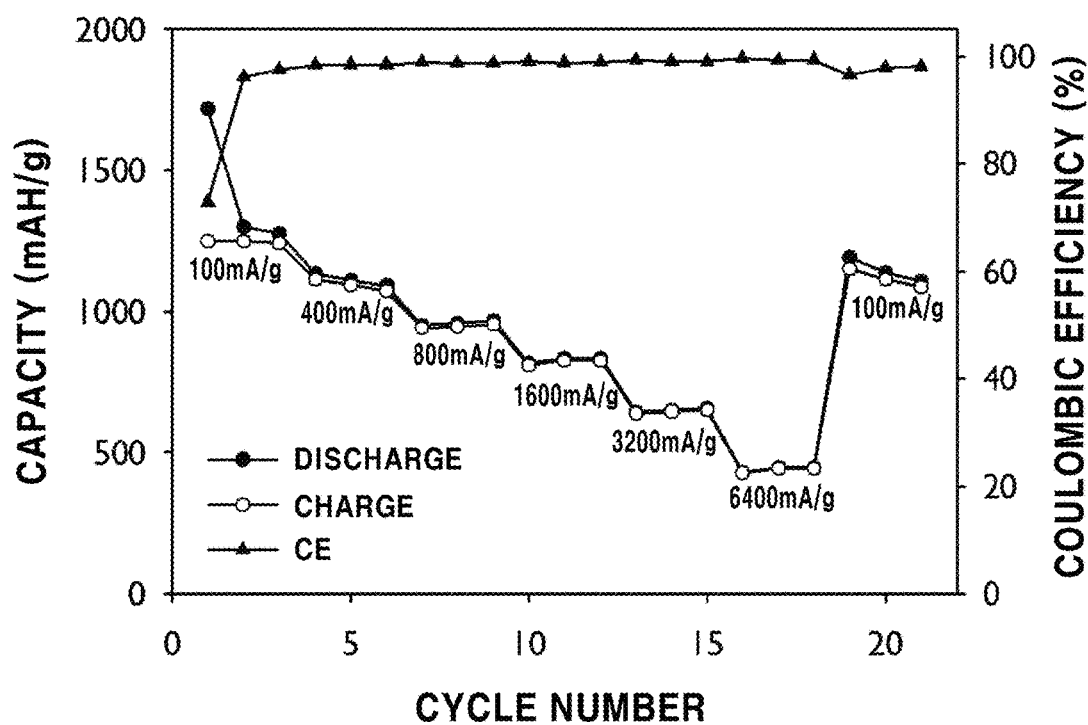
FIG. 6 shows the result of a rate-limiting characteristic and a coulombic efficiency of the battery test of the carbon-silicon composite structure in accordance with an example of the present disclosure.

In addition, a rate-limiting characteristic and a coulombic efficiency of the battery using the carbon-silicon composite structure according to the present Example was measured, as shown in FIG. 6. Referring to FIG. 6, when a current density was increased from 100 mA/g to 6,400 mA/g, a charge/discharge capacity was maintained at about 34%, and the coulombic efficiency was maintain at about at least 99%. This result showed that the carbon-silicon composite structure of the present Example can be applied as an anode material for a lithium-ion battery.

The above description of the present disclosure is provided for the purpose of illustration, and it would be understood by those skilled in the art that various changes and modifications may be made without changing technical conception and essential features of the present disclosure. Thus, it is clear that the above-described examples are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A method of preparing a carbon-silicon composite structure, comprising:
   polymerizing an aromatic monomer to form polymer particles;
   cross-linking the polymer particles to obtain cross-linked polymer particles;
   carbonizing the cross-linked polymer particles through calcination to obtain carbon particles; and
   mixing the carbon particles with silicon nanoparticles to obtain a carbon particle layer in which silicon nanoparticles are dispersed,
   wherein the cross-linking of the polymer particles includes cross-linking through a Friedel-Crafts acylation reaction.

2. The method of preparing a carbon-silicon composite structure of claim 1, wherein the silicon nanoparticles are crystalline.

3. The method of preparing a carbon-silicon composite structure of claim 1, wherein the silicon nanoparticles have a size of from 10 nm to 10 µm.

4. A carbon-silicon composite structure, comprising a carbon particle layer in which silicon nanoparticles are dispersed, which is prepared by the method according to claim 1.

5. A secondary battery anode material, comprising the carbon-silicon composite structure of claim 4.

6. A secondary battery, comprising an anode including the secondary battery anode material according to claim 5, a cathode, a separator, and an electrolyte.

7. A method of preparing a carbon-silicon composite structure comprising:
   polymerizing an aromatic monomer to form polymer particles;
   cross-linking the polymer particles to obtain cross-linked polymer particles;
   carbonizing the cross-linked polymer particles through calcination to obtain carbon particles; and
   mixing the carbon particles with silicon nanoparticles to obtain a carbon particle layer in which silicon nanoparticles are dispersed;
   wherein the aromatic monomer includes a member selected from the group consisting of styrenes, benzamides, butyleneterephthalates, ethyleneterephthalates, methylmethacrylate-based compounds, vinylpyridine-based compounds, and combinations thereof.

8. The method of preparing a carbon-silicon composite structure of claim 7, wherein the silicon nanoparticles are crystalline.

9. The method of preparing a carbon-silicon composite structure of claim 7, wherein the silicon nanoparticles have a size of from 10 nm to 10 μm.

10. A carbon-silicon composite structure, comprising a carbon particle layer in which silicon nanoparticles are dispersed, which is prepared by the method according to claim 7.

11. A secondary battery anode material, comprising the carbon-silicon composite structure of claim 10.

12. A secondary battery, comprising an anode including the secondary battery anode material according to claim 11, a cathode, a separator, and an electrolyte.

* * * * *